(12) United States Patent
Yang et al.

(10) Patent No.: US 12,139,036 B2
(45) Date of Patent: Nov. 12, 2024

(54) SECURE AND EFFICIENT COMPUTING SHARING FOR ELECTRIC AUTOMOBILES

(71) Applicant: Intel Corporation, Santa Clara, CA (US)

(72) Inventors: Bin Yang, Shanghai (CN); Shoumeng Yan, Beijing (CN); Zhifang Long, Shanghai (CN); Yanmin Zhang, Xuhui (CN); Jia Bao, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 370 days.

(21) Appl. No.: 17/598,193

(22) PCT Filed: Jun. 28, 2019

(86) PCT No.: PCT/CN2019/093513
§ 371 (c)(1),
(2) Date: Sep. 24, 2021

(87) PCT Pub. No.: WO2020/258206
PCT Pub. Date: Dec. 30, 2020

(65) Prior Publication Data
US 2022/0169140 A1     Jun. 2, 2022

(51) Int. Cl.
*B60L 53/66*     (2019.01)
*B60L 53/65*     (2019.01)
*G06F 9/48*     (2006.01)

(52) U.S. Cl.
CPC .............. *B60L 53/66* (2019.02); *B60L 53/65* (2019.02); *G06F 9/4806* (2013.01)

(58) Field of Classification Search
CPC ........ B60L 53/66; B60L 53/65; G06F 9/4806; G06F 9/5027; G06F 2209/509; G06F 2209/503; Y02D 10/00
See application file for complete search history.

(56) References Cited

U.S. PATENT DOCUMENTS

| | | |
|---|---|---|
| 2013/0304863 A1 | 11/2013 | Reber |
| 2017/0146354 A1 | 5/2017 | Boss et al. |

(Continued)

FOREIGN PATENT DOCUMENTS

| | | |
|---|---|---|
| CN | 103853132 A | 6/2014 |
| CN | 104271386 A | 1/2015 |

(Continued)

OTHER PUBLICATIONS

Machine Translation of description of EP-2739011-A1, pp. 1-5 (Year: 2014).*

(Continued)

*Primary Examiner* — Anne Marie Antonucci
*Assistant Examiner* — Jared C Bean
(74) *Attorney, Agent, or Firm* — Schwegman Lundberg & Woessner, P.A.

(57) ABSTRACT

An electric vehicle computing sharing system (100) is adapted to receive a signal indicating the electric vehicle (110, 120, 130) is connected to a charging station (115, 125, 135). The computing sharing system (100) may be further adapted to receive information about the electric vehicle (110, 120, 130). The computing sharing system (100) may be further adapted to determine a predicted charging duration (535) for the electric vehicle (110, 120, 130). The computing sharing system (100) may be further adapted to identify a task for execution by a computing resource of the electric vehicle (110, 120, 130) based on the predicted charging duration (535). The computing sharing system (100) may be further adapted to transmit the task to the electric vehicle (110, 120, 130). The computing sharing system (100) may be further adapted to receive a result for the task from the electric vehicle (110, 120, 130).

24 Claims, 9 Drawing Sheets

(56) References Cited

U.S. PATENT DOCUMENTS

| | | | | |
|---|---|---|---|---|
| 2019/0047435 A1* | 2/2019 | Waffner | | B60L 53/65 |
| 2019/0121661 A1* | 4/2019 | Kanada | | H02J 7/143 |
| 2020/0143338 A1* | 5/2020 | Lucidarme | | G06Q 50/06 |
| 2020/0303938 A1* | 9/2020 | Owen | | H01M 10/44 |
| 2021/0316632 A1* | 10/2021 | Hauschild | | G06F 9/5072 |

FOREIGN PATENT DOCUMENTS

| | | | | |
|---|---|---|---|---|
| CN | 106254536 A | | 12/2016 | |
| EP | 2739011 A1 | * | 6/2014 | ............ H04L 67/10 |
| JP | 2017021584 A | | 1/2017 | |
| KR | 101957343 | | 3/2019 | |
| WO | WO-2019034226 A1 | | 2/2019 | |
| WO | 2019057330 | | 3/2019 | |
| WO | WO-2020258206 A1 | | 12/2020 | |

OTHER PUBLICATIONS

"European Application Serial No. 19935069.5, Extended European Search Report mailed Apr. 20, 2023", 8 pgs.
"European Application Serial No. 19935069.5, Response filed Oct. 26, 23 to Extended European Search Report mailed Apr. 20, 2023", 10 pgs.
"International Application Serial No. PCT/CN2019/093513, International Search Report mailed Mar. 30, 2020", 5 pgs.
"International Application Serial No. PCT/CN2019/093513, Written Opinion mailed Mar. 30, 2020", 4 pgs.

* cited by examiner

SECURE AND EFFICIENT COMPUTING SHARING FOR ELECTRIC AUTOMOBILES

PRIORITY APPLICATION

This application is a U.S. National Stage Application under 35 U.S.C. 371 from International Application No. PCT/CN2019/093513, filed 28 Jun. 2019, published as WO 2020/258206, which is incorporated herein by reference in its entirety.

TECHNICAL FIELD

Embodiments described herein generally relate to sharing computing resources of electric vehicles and, in some embodiments, more specifically to identifying the time and amount of usage for those computing resources.

BACKGROUND

Utilization of electric vehicles and autonomously driven electric vehicles is rapidly growing. Many automotive producers are planning to produce electric autonomously driven vehicles in the near future. To meet the requirement of autonomous driving, robust and real-time computing analysis capability is required. This leads to electric vehicles being equipped with more computing resources, such as processors, graphic processors, and storage. At the same time, fast-evolving battery technology provides the power needed to utilize the computing resources for long amounts of time. But the utilization of these resources with privately-owned electric automotive vehicles is very low. Electric vehicles are parked at a home or at the office most of the time. A large benefit may be provided to customers and the advancement of autonomous vehicles if the computing power provided by idle electric automotive vehicles may be utilized.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
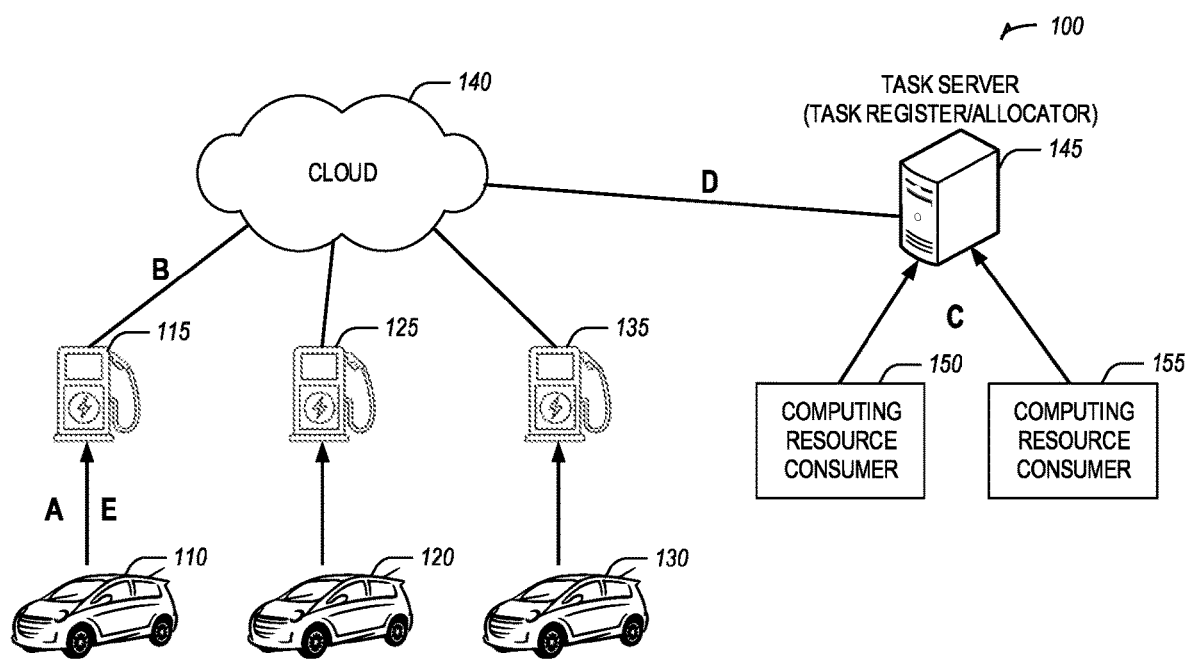
FIG. 1 illustrates an example system for computing sharing for electric vehicles, in accordance with some embodiments.

The battery system in electric vehicles must be recharged for the vehicle to continue operating, similar to mobile phones and other devices with rechargeable batteries. While quick charging capabilities are available, in most instances people recharge their electric vehicle by plugging it in overnight at their home. To encourage people to use electric vehicles for their commute, many office complexes and parking garages also offer recharging services so that electric vehicle owners may recharge their vehicles while they are at work.

Whether overnight or at the office, these recharging times are usually several hours long. During this time the vehicle is connected to a continuous power source while the advanced computing resources of the vehicle are idle. It would be beneficial to take advantage of these idle computing resources, such as for sharing the computing resources for use in developing the artificial intelligence (AI) for autonomously driven vehicles.

To utilize the computing resources of electric vehicles, a network connection and continuous power are indispensable. But even with these resources, other problems exist in order to utilize the computing resources of electric vehicles. A first consideration is a balance of power for the vehicle and the computations being performed. The computing tasks may drain the battery, even when the vehicle battery system is being charged. The task allocation/scheduling strategy should consider heuristic tradeoffs between battery status and computational task power consumption. A second consideration is security and protecting the systems of the vehicle from the computational tasks. A third consideration is protecting the privacy of the computing task data calculated and processed by each vehicle system that shares computing resources. A fourth consideration is ensuring the computing result is valid. An act as simple as the vehicle owner or operator choosing to operate the vehicle in the middle of the computational tasks could disturb the results.

The methods and techniques described herein are for a computing sharing solution to utilize the powerful computing resource of electronic vehicles when they are idle and being charged. The task allocation/scheduling decision is based on the performance profile of a task and the power consumption profile of the task, which includes making a heuristic tradeoff between the battery status, the battery charging ratio, the predicted charging termination, and task computation/energy consumption. Further, as it is vehicle with many safety protocols in addition to the general safety of the passengers in the vehicle, the computational tasks should not break the safety critical requirements of the vehicle.

In exchange for utilizing the computing capacity of electric vehicles to perform complex computing tasks, benefits and rewards may be offered to electric vehicle owners, such as free charging for the vehicle or other monetary benefits. An owner may be able to build credits which may be used toward the purchase of another electric vehicle.

Utilizing the computing resources of electric vehicles presents challenges not found with other distributed computing systems. These challenges include limited battery or power, battery and power management, limited execution duration, security for the privacy of the vehicle owner, and security for the safety of the vehicle performance.

FIG. 1 illustrates an example system 100 for computing sharing for electric vehicles, in accordance with some embodiments. A task server 145 receives computing requests and allocates tasks to electric vehicles. Electric vehicles 110, 120, and 130 connect to charging stations 115, 125, and 135, such as at the electric vehicle owner's home or office. When the electric vehicles 110, 120, and 130 are connected to the charging stations 115, 125, and 135, the vehicles communicate over a network through the cloud 140 with the task server 145 to receive computing tasks to perform and report the results of the computing tasks. The electric vehicles 110, 120, and 130 may communicate with the network either wirelessly, such as over a Wi-Fi connection at the home, or a wired connection through the charging stations 115, 125, and 135.

In an example embodiment, the computing sharing for electric vehicles may include the following process. At step A, electric vehicle 110 joins the cloud 140 or computing network through charging station 115. At step B, historical data and user preferences of electric vehicle 110 are sent to the task server 145 through the cloud 140. The historical data may include the driving history of the vehicle, including video and location information. The historical data may contain the driving history of the vehicle, including video and location information, the parked and charging duration history, along with battery levels. For example, historical data includes data for the times electric vehicle 110 was parked and driven again, as well as when it was connected to charging station 115 with the batter level at the time it was connected. The user preferences may include the types of data that is accessible from the vehicle and limits for using the computing resources of the vehicle, such as limits for time or power.

At step C, the task server 145 receives computing tasks from computing resource consumers 150 and 155. The computing resource consumers 150 and 155 may register tasks to be performed by the computing resources of electric vehicles with the task server 145. At step D, the task server 145 selects the suitable computing tasks for the electric vehicle 110 to execute based on factors such as the duration of the task, the battery level, and the power consumed.

At step E, after the electric vehicle 110 completes the execution of the assigned task, the result of the task is transmitted from electric vehicle 110 to task server 145 for validation. The task server 145 may allocate the same task to electric vehicles 110, 120, and 130. The task server 145 may validate the results received from electric vehicles 110, 120, and 130 by comparing the results from each electric vehicle.

Figure 2:
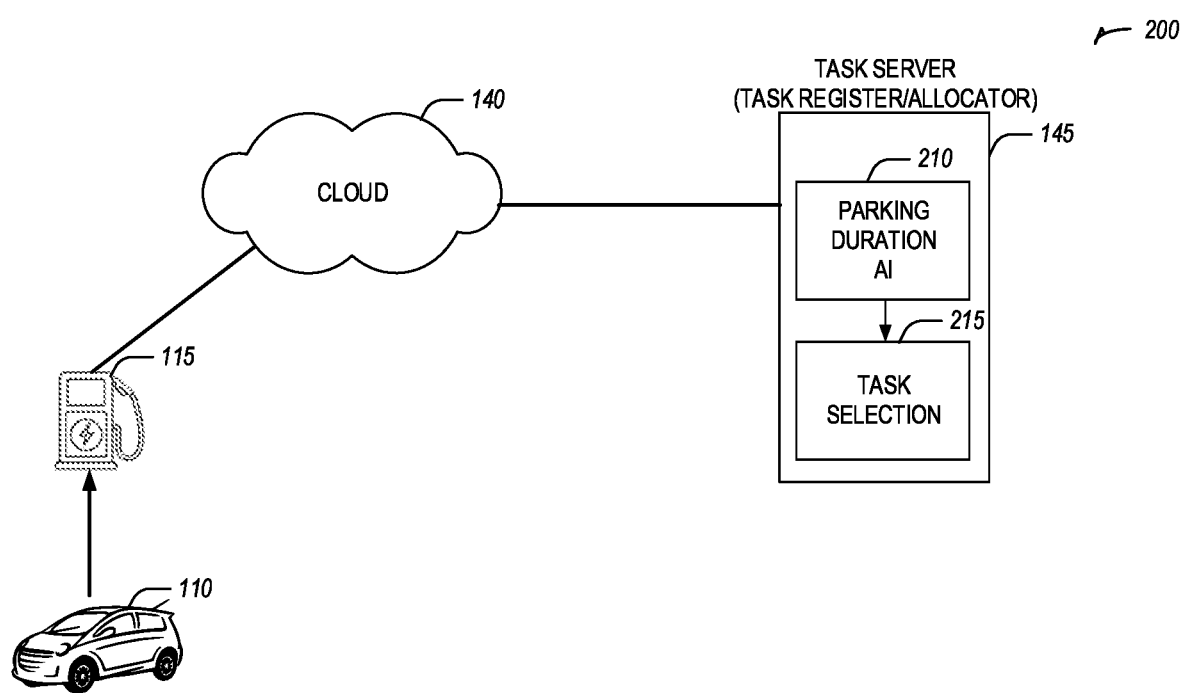
FIG. 2 illustrates a detailed process embodiment for computing sharing with a specific electric vehicle, in accordance with some embodiments.

FIG. 2 illustrates a detailed process embodiment for computing sharing with a specific electric vehicle, in accordance with some embodiments. When electric vehicle 110 connects to charging station 115, a communication is made to the charging station 115 that includes the historical data and user preferences. The electric vehicle 110 may communicate battery information such as the battery capacity and the battery status (e.g., the current power level of the battery). The charging station 115 collects this data from the electric vehicle 110 and transmits the data through the cloud 140 to the task server 145, along with the max charging current of the charging station 115, the address (e.g., geo-location), and the time.

The electric vehicle 110 may provide computing sharing profiles based on user preferences, such as fast charging, low-impact sharing, best effort, or automatic by the electric vehicle. Fast charging may indicate that there is no resource sharing available as the electric vehicle needs to be recharged as quickly as possible. Low-impact sharing may indicate that computing sharing resources are available when the battery level is at a certain level or greater, such as at 90%. Best effort may indicate the computing resources to process the tasks are shared as at best a rate as possible. An automatic may include different levels which provide for the computing system of the electric vehicle to determine how to share computing resources. For example, if the battery level is lower than 30%, then there is no resource sharing. If the battery level is greater than 30% but less than 90%, then low-impact sharing may be available. If the battery level is greater than 90%, then the resources may be shared as requested. Any task being executed should be stopped and migrated to another electric vehicle if the driver wants to drive the car.

The task server 145 utilizes a parking duration AI 210 to determine how long the electric vehicle 110 may be parked and connected to the charging station 115. In an embodiment, the parking duration AI 210 may use the provided data and a machine-learning model to predict the parking duration. The machine-learning model may use the historical data provided by electric vehicle 110 to build a model that predicts the duration of time that the electric vehicle 110 will be parked and connected to charging station 115. For example, the owner of electric vehicle 110 may have the car parked in their garage and charging for 10 hours every week day night, but on Saturday nights the owner typically goes out and does not return the vehicle to the garage until late at night. Thus, the vehicle may only charge for 6 hours on Saturday nights. The machine-learning model learns this habit so that the parking duration AI 210 may predict that Saturday night is not suitable time for performing tasks with a long duration.

Once the parking duration AI 210 determines a predicted parking duration for the electric vehicle 110 to be parked and connected to charging station 115, the task server 145 performs task selection 215. In general, the task selection 215 process selects a task for the electric vehicle 110 which may be performed within the determined parking duration. The task selection 215 process includes additional factors such as balancing the power required for processing the task with charging the electric vehicle 110. The assigned task should not prevent the electric vehicle 110 from being fully charged.

Determining an appropriate task is balance between the requirements to fully charge the battery of electric vehicle 110 and the power requirements to share the computing resources to complete the assigned task. The following algorithm may be used to determine this balance:

$$Fn(T,V,C)-Pcom-Cused*T>=(M1-M0)*T.$$

Where Fn(T, V, C) is the power output of charging station 115 with T as the charging duration, V as the charging voltage in charging station 115, and C as the maximum charging current. The Pcom parameter is the power consumed by the assigned task and Cused as the power being consumed by any currently running tasks. This is balanced against M0 as the current battery level and M1 as the target battery level. The computing resources of electric vehicle 110 may accept multiple tasks to process, thus the Cused parameter includes the power consumed by the currently running tasks which have not yet completed. New tasks may be delivered to electric vehicle 110 if it still has some power bandwidth.

Utilizing the computing resources of an electric vehicle requires a balancing of power as well as security safe guards to prevent unauthorized access to the electric vehicles systems. Sharing the computing resources of the electric vehicle invites non-essential and non-native tasks to be executed on the computing resources. Thus, this creates a potential for the execution of tasks which attempt to gain unauthorized access to the vehicle's systems.

Figure 3:
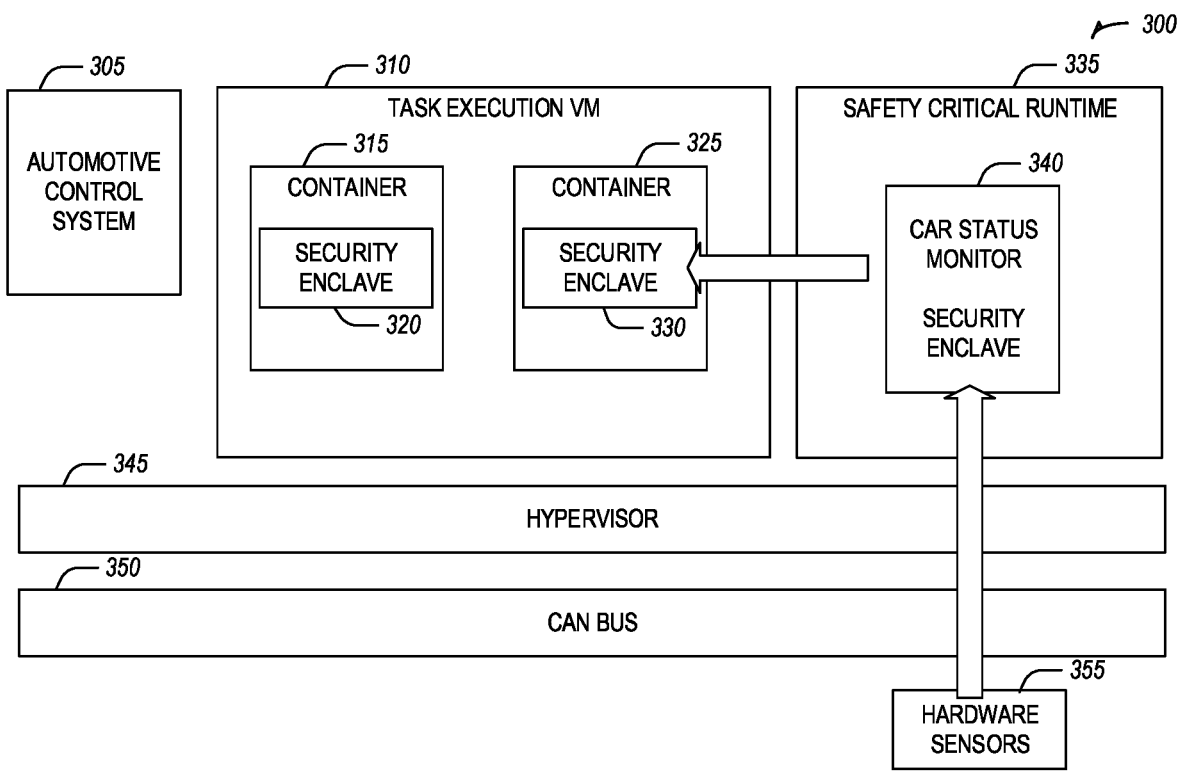
FIG. 3 illustrates an example vehicle computing framework of an electric vehicle, in accordance with some embodiments.

FIG. 3 illustrates an example vehicle computing framework 300 of an electric vehicle, in accordance with some embodiments. The automotive control system 305 is a core component of the vehicle computing framework 300. The automotive control system 305 controls the vehicle, collects data, and interacts with the driver. The automotive control system 305 controls aspects of the electric vehicle such as the speed of the electric vehicle, climate control, and lights. The automotive control system 305 may collect data from cameras, such as for pedestrian alerts.

The safety critical runtime 335 is a monitor to ensure the electric vehicle meets function safety (FuSa) standards. During operation of the electric vehicle, both hardware and software systems may fail, which would cause danger for passengers of the vehicle and those in proximity of the vehicle. The safety critical runtime 335 monitors all components of the vehicle and takes urgent actions whenever components fail.

The hardware sensors 355 are sensors of the electric vehicle. This may include standard vehicle sensors like a speed sensor and temperature sensor, as well as autonomous vehicle sensors such as cameras. The Controller Area Network (CAN) bus 350 is a vehicle specific bus which allows microcontrollers and devices to communicate. The hypervisor 345 isolates the hardware sensors 355 and the CAN bus 350 to protect unauthorized access or control to those systems and hardware.

The hardware sensors 355 may provide a signal indicating if the electric vehicle is moving or stopped, and other information such as overheating. The safety critical runtime 335 receives the hardware sensor 355 data directly from the CAN bus 350. The safety critical monitor 335 includes a car status monitor 340 which executes within a security enclave, such as Intel's Software Guard Extensions (SGX). A set of central processor unit (CPU) code instructions allows for user-level code to allocate private regions of memory, called enclaves that are protected from processes running at higher privilege levels. The enclaves are virtual enclaves that increase the security of application code and data within the enclave. This provides more protection from disclosure or modification to the task within the enclave. It also provides for user-level and operating system code to define private regions of memory where contents are protected and unable to be either read or saved by any process outside the enclave itself, including processes running at higher privilege levels.

The car status monitor 340 determines from the data provided by the hardware sensors 355, the current state of the electric vehicle. The safety critical runtime 335 uses the determination from the vehicle status monitor 340 to indicate if a shared computing task may execute in the task execution virtual machine (VM) 310. For example, if the car status monitor 340 determines the electric vehicle is in motion, then a shared computing task may not execute or is terminated if currently executing.

The data from the hardware sensors 355 and CAN bus 350 to the safety critical runtime 335 is secured through the security enclave of the car status monitor 340 so it cannot be accessed by the shared computing task. These systems are critical for the operation of the electric vehicle, thus any malicious action could result in injury to the electric vehicle passengers and those on a roadway with the electric vehicle.

When an electric vehicle receives a shared computing task, the tasks are executed as part of the task execution VM 310. Each shared computing task is executed in a container for isolation and security of the task from the rest of the computing system. For example, task execution VM 310 includes container 315 and container 325. For an added level of security to protect any sensitive data that may be a part of the shared computing task, the shared computing tasks execute within a security enclave. For example, for task execution VM 310, the shared computing task in container 315 is protected by security enclave 320 and the shared computing task in container 325 is protected by security enclave 330.

Figure 4A:
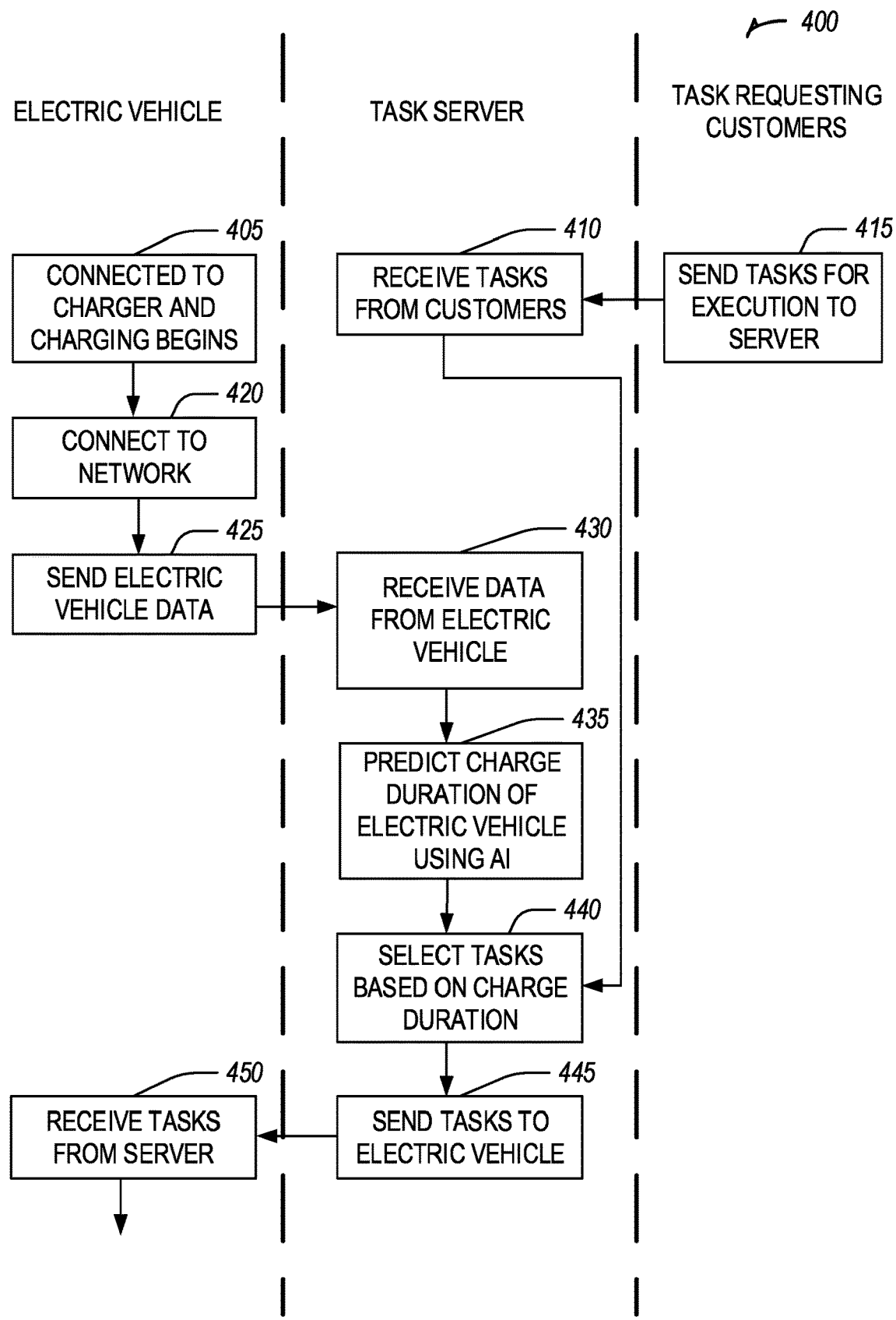
FIGS. 4A and 4B illustrate a workflow for sharing the computing resources of an electric vehicle, in accordance with some embodiments.
Figure 4B:
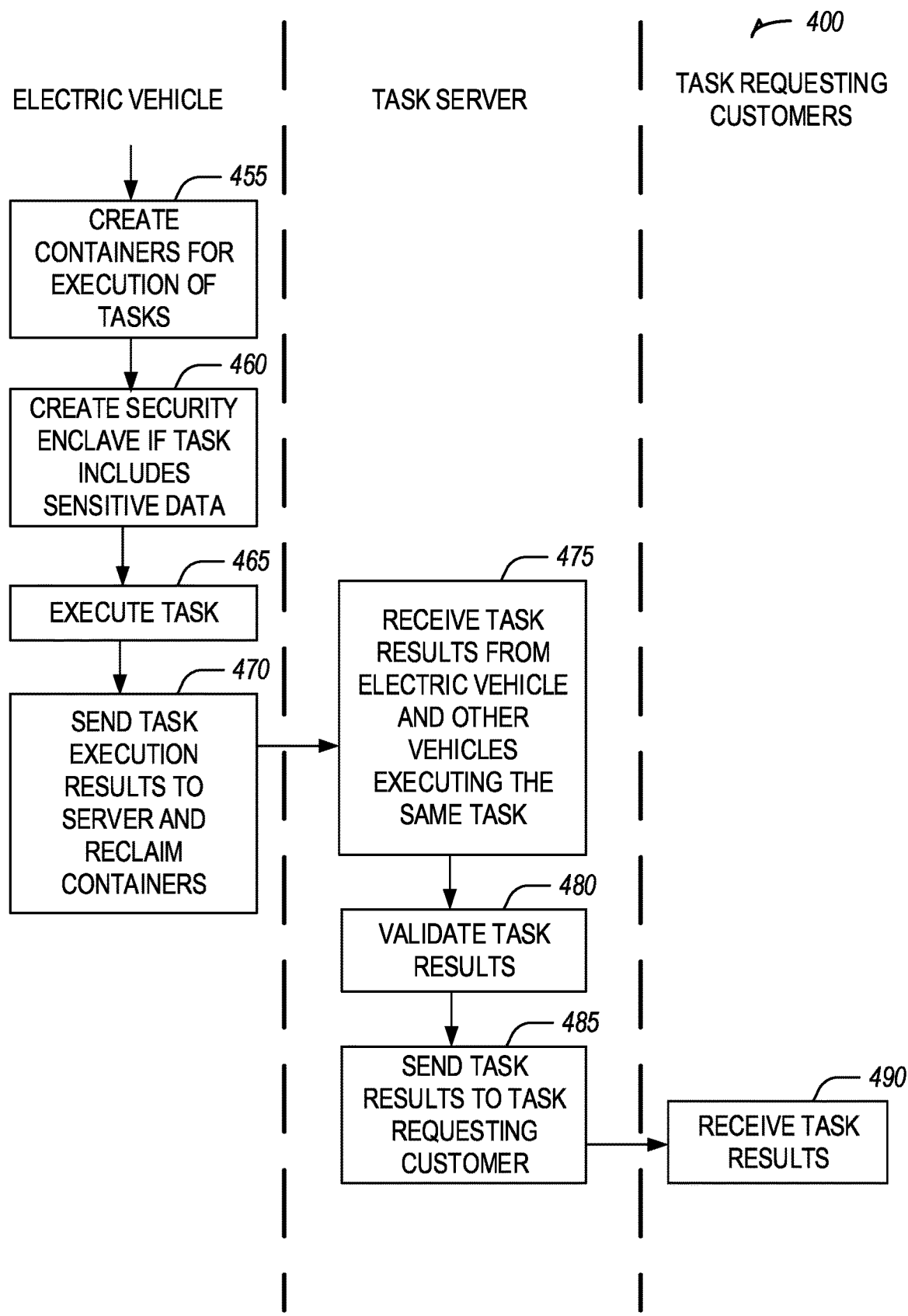

FIGS. 4A and 4B illustrate a workflow 400 for sharing the computing resources of an electric vehicle, in accordance with some embodiments. At operation 405, the electric vehicle is connected to a charging station, such as at the owner's home or office, and charging of the electric vehicle battery begins. At operation 420, the electric vehicle connects to a network. The electric vehicle may be configured to connect to a network automatically or configured to only connect to a network when connected to the charging station. Once connected to the service platform or task server, at operation 425, the electric vehicle transmits data about the electric vehicle to the task server. The transmitted data may include information about the current state of the electric vehicle such as the batter level and location of the electric vehicle, as well as environmental data such as the temperature and local time. Historical data about the vehicle may be included, such as the charging history of the electric vehicle and driving history. At operation 430, the task server receives the data from the electric vehicle.

At any point in time, customers may request tasks to be completed. Customers may be anyone that has a computing task to be completed. At operation 415, a customer may send a task to the task server for execution. At operation 410, the task server receives the requested tasks and stores the tasks for execution.

With the data about the electric vehicle, such as the charge history, the current battery level, and the battery capacity, the task server may predict the charge duration of the electric vehicle at operation 435. AI may be used to predict the charging duration. The AI may use information such as the charging history, the current day and date, and the owner's personal calendar to predict the charging duration. At operation 440, the task server selects tasks for the computing resources of the electric vehicle to execute based on the charging duration and the stored tasks. For example, based on the charging duration, the task server selects a set of tasks that may be fully executed with in the charging duration time. At operation 445 the task server sends the tasks for execution to the electric vehicle and at operation 450 the electric vehicle receives the tasks for execution.

Once the electric vehicle has received a task or set of tasks for execution, the computing system of the electric vehicle may create containers in a virtual machine for the tasks to execute in, at operation 455. The containers are used to protect the rest of the computing system of the electric vehicle from the executing tasks. Optionally, at operation 460 the computing system may create a security enclave to protect the data of the executing task, such as if the task includes sensitive data.

At operation 465, the computing resources of the electric vehicle executes the task assigned by the task server. At operation 470, the results of the task are sent to the task server and the computing system reclaims the containers created for executing the tasks. At operation 475, the task server receives the results from the electric vehicle. Additionally, the task server may receive results from other electric vehicles which were assigned the same task. At operation 480, the result is validated by comparing the results received from other electric vehicles which were assigned the same task. If the results cannot be validated, such as by a majority of the results being the same, then the task may be placed back in a queue for execution again. If the results are validated, then at operation 485 the results are sent to the customer which requested the task and at operation 490, the customer receives the result.

Figure 5:
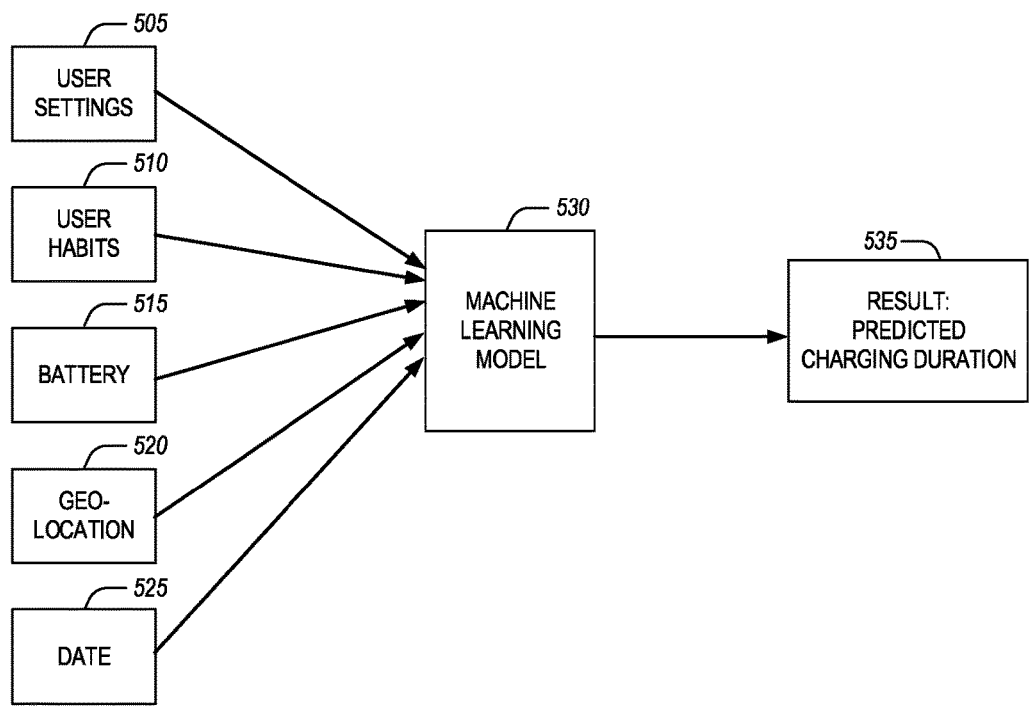
FIG. 5 illustrates an example of the machine learning model to determine the charging duration, in accordance with some embodiments.

FIG. 5 illustrates an example 500 of the machine learning model to determine the charging duration, in accordance with some embodiments. The machine learning model 530 may receive historical data from an electric vehicle which is used to train the machine learning model 530. The historical data includes each instance the vehicle was connected to a charging station and the duration of time for each of those charging sessions. Additionally, data may include the date, the location, and the starting battery level.

After training the machine learning model, when the electric vehicle is connected to a charging station, the current data about the electric vehicle is used by the machine learning model 530 to generate a result of the predicted charging duration 535. The machine learning model 530 may receive a set of data that is used to determine a predicted charging duration 535. This data may include user settings 505, user habits 510, battery information 515, geolocation 520, and the date 525.

The user settings 505 may be preferences the user has for sharing the computing resources of the electric vehicle. This may be limits for the maximum amount of time the computing resources may be utilized or what times and dates are acceptable for using the computing resources.

The user habits 510 may be data that is from the electric vehicle owner's personal calendar (and calendar of other family members). For example, on days where the owner has an early morning meeting, then the electric vehicle is removed from charging station earlier than other mornings. Data from the owner's personal calendar may indicate user habits 510 and be used to identify how predicted charging durations 535 differ based on the calendar events and user habits 510.

The battery information 515 may include data about the current level of power in the battery and the overall capacity of the battery in the electric vehicle. Battery information 515 may include charging rate, as different batteries may charge at different rates or have the capabilities of slow or fast charges.

The geolocation 520 may provide information about the location of the vehicle and charging station, and characteristics about that location. Common locations for the electric vehicle include the home and the office. An electric vehicle owner may visit the gym where there is a charging station. This locational data may be used to determine the predicted charging duration 535 as an electric vehicle parked at home over night may be connected to the charging station for 8 hours, while at the gym the connection may be for an hour.

The date 525 may be used to determine a weekday versus a weekend day where the length of charging may differ. Additionally, certain days of the week may differ, such as if the owner leaves for work early on Tuesdays. A calendar may be cross referenced with the date to identify significant dates such as holidays. For example, if the date is identified to be Memorial Day, then the predicted charging duration 535 may not be the same as other Mondays.

Figure 6:
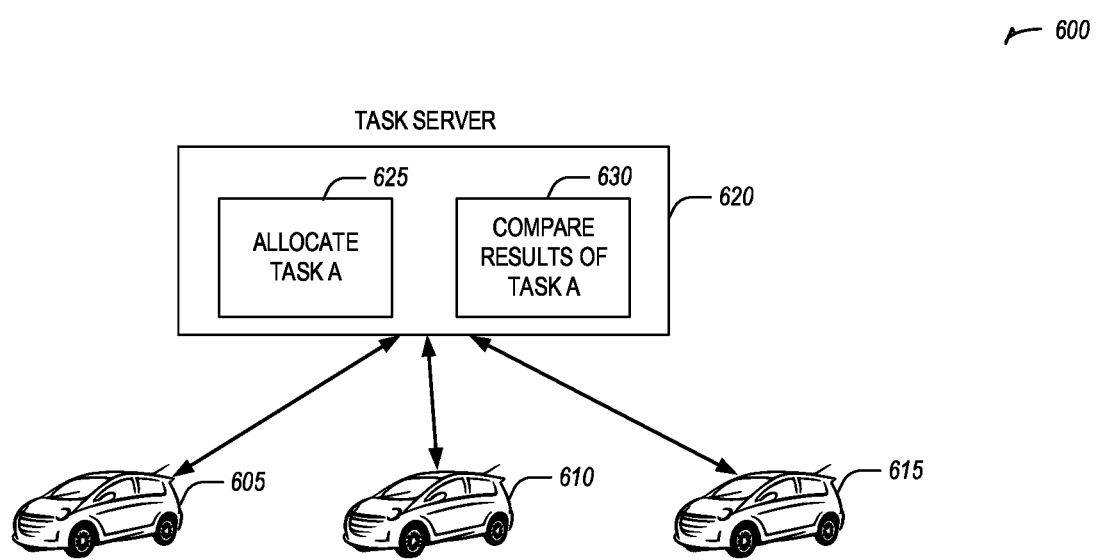
FIG. 6 illustrates an example of the validation of tasks for computing sharing for electric vehicles, in accordance with some embodiments.

FIG. 6 illustrates an example 600 of the validation of tasks for computing sharing for electric vehicles, in accordance with some embodiments. Utilizing the computing resources of electric vehicles is beneficial in that it makes use of computing resources that would otherwise be sitting idle. However, it has drawbacks as it is not as stable as a computer farm housed in an environmentally controlled location. The main issue that may arise when using the computing resources of an electric vehicle is that the task being performed is interrupted. A common occurrence may be that the owner of the electric vehicle chooses to drive the vehicle at a non-typical time and thus interrupts the charging and execution of assigned tasks which were based on the predicted charging duration. Similar interruptions to task execution may occur because of a loss of power or network connectivity.

In order to balance this instability with accurate results for task execution, the task server 620 may use redundancy to allocate the same task to multiple electric vehicles. In the example 600, the task server 620 has an allocation process 625 to allocate, or assign, the same task, Task A, to multiple vehicles, such as electric vehicle 605, electric vehicle 610, and electric vehicle 615. Each of electric vehicle 605, electric vehicle 610, and electric vehicle 615 executes Task A and reports the result back to task server 620. The task server 620 executes a validation process 630 to compare the results of Task A received from electric vehicle 605, electric vehicle 610, and electric vehicle 615. Assigning the same task to multiple vehicles may ensure the results reported are accurate. The task server 620 may use a majority rule to determine result accuracy. The result reported by the majority of electric vehicles may be considered the accurate result. If less than a majority of vehicles report the same result, then the task may be reassigned.

Figure 7:
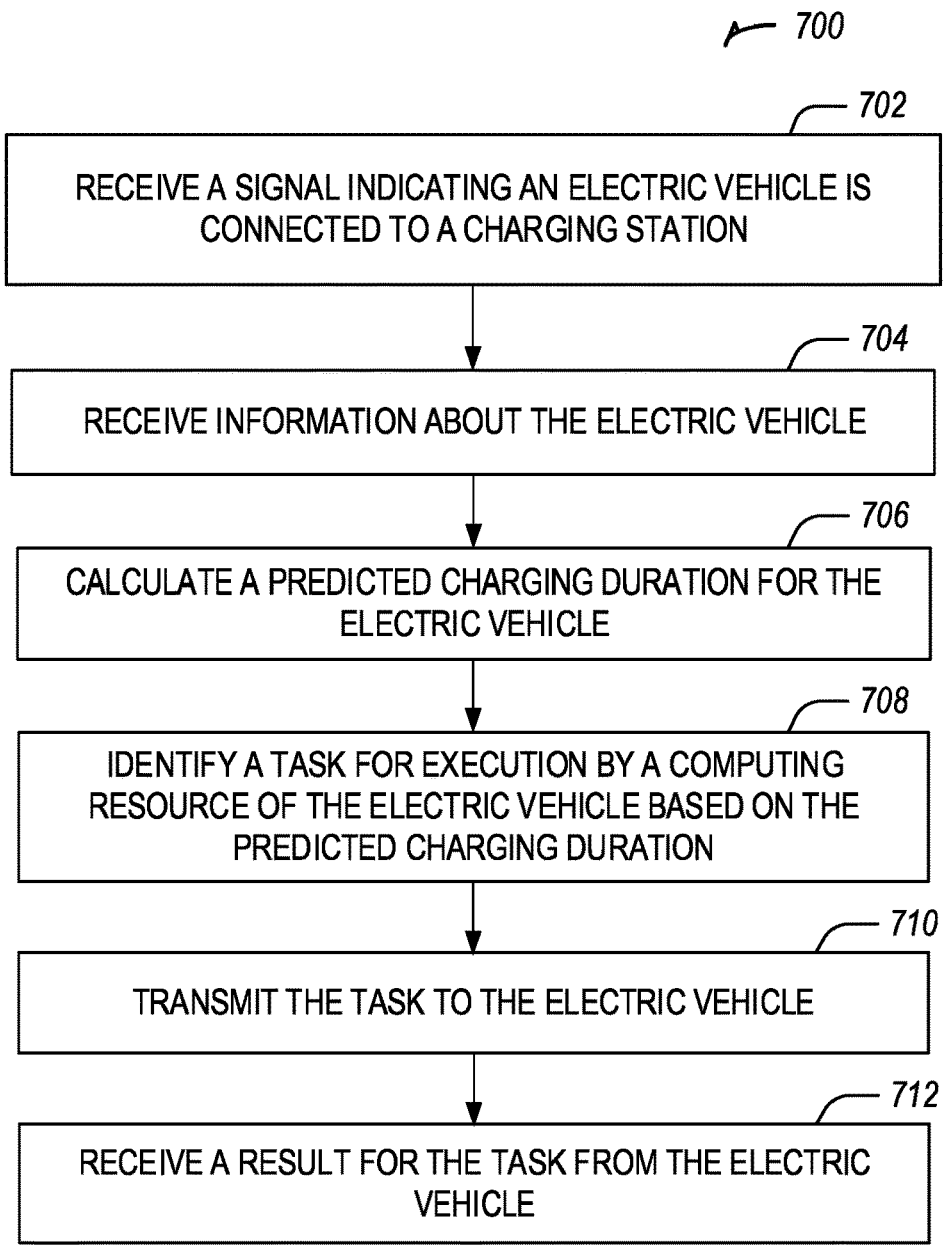
FIG. 7 illustrates a flowchart showing a technique for sharing computing resources of an electric vehicle, in accordance with some embodiments.

FIG. 7 illustrates a flowchart showing a technique 700 for sharing computing resources of an electric vehicle, in accordance with some embodiments. The technique 700 includes an operation 702 to receive a signal indicating an electric vehicle is connected to a charging station. A signal may be transmitted over a network to a task allocation server indicating that the electric vehicle is currently being charged. The technique 700 includes an operation 704 to receive information about the electric vehicle. The information may include charging history and the current battery level of the electric vehicle.

The technique 700 includes an operation 706 to determine a predicted charging duration for the electric vehicle. Determining the predicted charging duration may be based on preferences of the owner of the electric vehicle. For example, the owner may provide preferences regarding how much time may be used for shared computing resources or at what battery levels it is acceptable to share the computing resources. Preferences may include days, times, or locations that resource sharing may or may not be permissible. The determination of the charging duration may be based on the charging history of the electric vehicle. The determination of the predicated charging duration may be based on at least one of the location of the electric vehicle, habits of a user of the electric vehicle, time of day, day of the week, or a holiday.

The technique 700 may further include an operation to train a machine-learning model to determine the predicted charging duration using the charging history and current battery level of the electric vehicle. The training of the machine-learning model may include data about the habits or schedule of the owner and owner's family members of the electric vehicle. The training may include using the personal calendar of a person associated with the electric vehicle.

The technique 700 includes an operation 708 to identify a task for execution by a computing resource of the electric vehicle based on the predicted charging duration. The identification of the task may include using the predicted charging duration in the identification of the task to identify a task which may be completed within the predicted charging duration. The technique 700 includes an operation 710 to transmit the task to the electric vehicle.

The technique 700 includes an operation 712 to receive a result for the task from the electric vehicle. The electric vehicle executes the task while charging and returns the result of the task. The technique 700 may further include an operation to receive a set of validation results from a plurality of electric vehicles that executed the same task. The technique 700 may further include an operation to validate the result with the set of validation results received from the plurality of electric vehicle which executed the same task.

Figure 8:
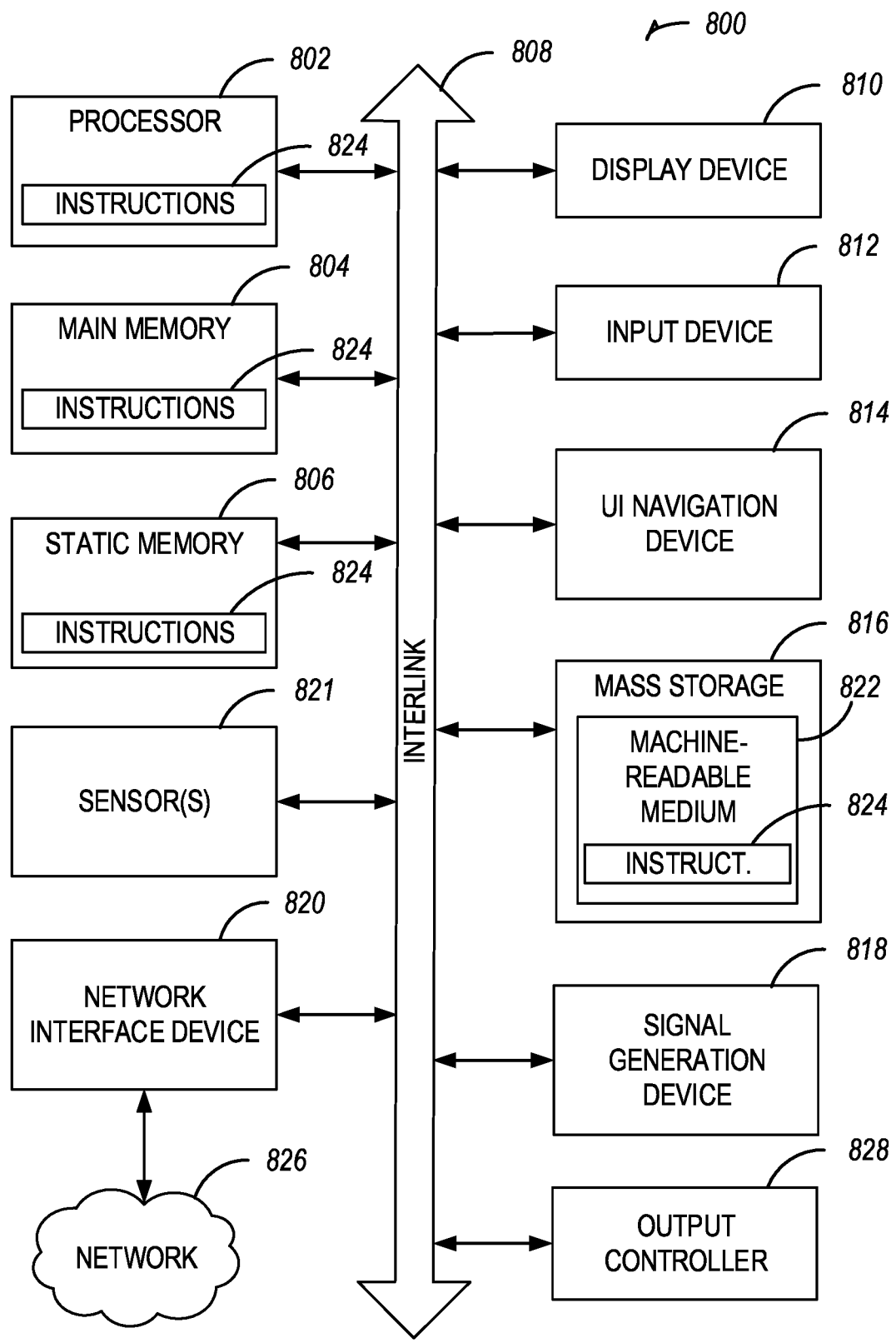
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 800 may include a hardware processor 802 (e.g., a central processing unit (CPU), a graphics processing unit (GPU), a hardware processor core, field programmable gate array (FPGA), or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or used by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

Example 1 is a system for coordinating shared computing with an electric vehicle, comprising: at least one processor; and memory including instructions that, when executed by the at least one processor, cause the at least one processor to: receive a signal indicating the electric vehicle is connected to a charging station; receive information about the electric vehicle; determine a predicted charging duration for the electric vehicle; identify a task for execution by a computing resource of the electric vehicle based on the predicted charging duration; transmit the task to the electric vehicle; and receive a result for the task from the electric vehicle.

In Example 2, the subject matter of Example 1 includes, wherein the information includes a charging history and a current battery level of the electric vehicle.

In Example 3, the subject matter of Example 2 includes, wherein the predicted charging duration is based on preferences of the operator of the electric vehicle.

In Example 4, the subject matter of Examples 2-3 includes, wherein the predicted charging duration is based on the charging history of the electric vehicle.

In Example 5, the subject matter of Examples 2-4 includes, instructions to: train a machine-learning model to determine the predicted charging duration using the charging history and current battery level of the electric vehicle.

In Example 6, the subject matter of Example 5 includes, wherein the training further includes using a personal calendar.

In Example 7, the subject matter of Examples 1-6 includes, wherein the predicted charging duration is based on at least one of: a location of the electric vehicle, habits of a user of the electric vehicle, time of day, day of the week, or a holiday.

In Example 8, the subject matter of Examples 1-7 includes, instructions to: receive validation results from a plurality of electric vehicles for the task; and validate the result with the validation results.

Example 9 is a method for coordinating shared computing with an electric vehicle, comprising: receiving a signal indicating the electric vehicle is connected to a charging station; receiving information about the electric vehicle; determining a predicted charging duration for the electric vehicle; identifying a task for execution by a computing resource of the electric vehicle based on the predicted charging duration; transmitting the task to the electric vehicle; and receiving a result for the task from the electric vehicle.

In Example 10, the subject matter of Example 9 includes, wherein the information includes a charging history and a current battery level of the electric vehicle.

In Example 11, the subject matter of Example 10 includes, wherein the predicted charging duration is based on preferences of the operator of the electric vehicle.

In Example 12, the subject matter of Examples 10-11 includes, wherein the predicted charging duration is based on the charging history of the electric vehicle.

In Example 13, the subject matter of Examples 10-12 includes, training a machine-learning model to determine the predicted charging duration using the charging history and current battery level of the electric vehicle.

In Example 14, the subject matter of Example 13 includes, wherein the training further includes using a personal calendar.

In Example 15, the subject matter of Examples 9-14 includes, wherein the predicted charging duration is based on at least one of: a location of the electric vehicle, habits of a user of the electric vehicle, time of day, day of the week, or a holiday.

In Example 16, the subject matter of Examples 9-15 includes, receiving validation results from a plurality of electric vehicles for the task; and validating the result with the validation results.

Example 17 is a system to implement coordinating shared computing with an electric vehicle, the system comprising means to perform any method of Examples 9-16.

Example 18 is at least one machine-readable medium to implement coordinating shared computing with an electric vehicle, the at least one machine readable medium including instructions that, when executed by a machine, cause the machine to perform any method of Examples 9-16.

Example 19 is at least one computer readable medium including instructions for coordinating shared computing with an electric vehicle that when executed by at least one processor, cause the at least one processor to: receive a signal indicating the electric vehicle is connected to a charging station; receive information about the electric vehicle; determine a predicted charging duration for the electric vehicle; identify a task for execution by a computing resource of the electric vehicle based on the predicted charging duration; transmit the task to the electric vehicle; and receive a result for the task from the electric vehicle.

In Example 20, the subject matter of Example 19 includes, wherein the information includes a charging history and a current battery level of the electric vehicle.

In Example 21, the subject matter of Example 20 includes, wherein the predicted charging duration is based on preferences of the operator of the electric vehicle.

In Example 22, the subject matter of Examples 20-21 includes, wherein the predicted charging duration is based on the charging history of the electric vehicle.

In Example 23, the subject matter of Examples 20-22 includes, instructions to: train a machine-learning model to determine the predicted charging duration using the charging history and current battery level of the electric vehicle.

In Example 24, the subject matter of Example 23 includes, wherein the training further includes using a personal calendar.

In Example 25, the subject matter of Examples 19-24 includes, wherein the predicted charging duration is based on at least one of: a location of the electric vehicle, habits of a user of the electric vehicle, time of day, day of the week, or a holiday.

In Example 26, the subject matter of Examples 19-25 includes, instructions to: receive validation results from a plurality of electric vehicles for the task; and validate the result with the validation results.

Example 27 is a system for coordinating shared computing with an electric vehicle, comprising: means for receiving a signal indicating the electric vehicle is connected to a charging station; means for receiving information about the electric vehicle; means for determining a predicted charging duration for the electric vehicle; means for identifying a task for execution by a computing resource of the electric vehicle based on the predicted charging duration; means for transmitting the task to the electric vehicle; and means for receiving a result for the task from the electric vehicle.

In Example 28, the subject matter of Example 27 includes, wherein the information includes a charging history and a current battery level of the electric vehicle.

In Example 29, the subject matter of Example 28 includes, wherein the predicted charging duration is based on preferences of the operator of the electric vehicle.

In Example 30, the subject matter of Examples 28-29 includes, wherein the predicted charging duration is based on the charging history of the electric vehicle.

In Example 31, the subject matter of Examples 28-30 includes, means for training a machine-learning model to determine the predicted charging duration using the charging history and current battery level of the electric vehicle.

In Example 32, the subject matter of Example 31 includes, wherein the training further includes using a personal calendar.

In Example 33, the subject matter of Examples 27-32 includes, wherein the predicted charging duration is based on at least one of: a location of the electric vehicle, habits of a user of the electric vehicle, time of day, day of the week, or a holiday.

In Example 34, the subject matter of Examples 27-33 includes, means for receiving validation results from a plurality of electric vehicles for the task; and means for validating the result with the validation results.

Example 35 is at least one machine-readable medium including instructions that, when executed by processing circuitry, cause the processing circuitry to perform operations to implement of any of Examples 1-34.

Example 36 is an apparatus comprising means to implement of any of Examples 1-34.

Example 37 is a system to implement of any of Examples 1-34.

Example 38 is a method to implement of any of Examples 1-34.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for coordinating shared computing with an electric vehicle, comprising:
 at least one processor; and
 memory capable of storing instructions that, when executed by the at least one processor, cause the at least one processor to:
  obtain a signal based on connection of the electric vehicle to a charging station;
  obtain charging information about the electric vehicle including a current battery level determined from sensor data that measures at least one battery of the electric vehicle;
  calculate a predicted charging duration for the electric vehicle at the charging station, based on the charging information;
  identify a task for execution by a computing resource of the electric vehicle based on the predicted charging duration, power consumption of the computing resource for execution of the task and other uncompleted tasks, and availability of the computing resource of the electric vehicle to complete the task during the predicted charging duration, wherein the power consumption of the computing resource is capable of draining the at least one battery during the connection of the electric vehicle to the charging station;
cause transmission of the task to the electric vehicle; and
control execution of the task by the computing resource of the electric vehicle, during the connection of the electric vehicle to the charging station, wherein a result for the task is produced in response to completion of the task.

2. The system of claim 1, wherein the charging information additionally includes a charging history of the electric vehicle.

3. The system of claim 2, wherein the availability of the computing resource of the electric vehicle to complete the task is determined based on preferences of an operator of the electric vehicle.

4. The system of claim 2, wherein the instructions further cause the at least one processor to:
invoke a trained machine-learning model to calculate the predicted charging duration, using the charging information, to recharge the at least one battery to a full charge at the charging station.

5. The system of claim 4, wherein use of the trained machine-learning model to calculate the predicted charging duration further includes using information from a personal calendar.

6. The system of claim 1, wherein the predicted charging duration is calculated based on at least one of: a location of the electric vehicle, habits of a user of the electric vehicle, time of day, day of the week, or a holiday.

7. The system of claim 1, wherein the instructions further cause the at least one processor to:
receive validation results from a plurality of electric vehicles for the task; and
validate the result with the validation results.

8. The system of claim 1, wherein the instructions further cause the at least one processor to:
calculate the availability of the computing resource of the electric vehicle to complete the task during the predicted charging duration, based on power requirements for the task and power requirements for charging the electric vehicle.

9. A method for coordinating shared computing with an electric vehicle, comprising:
receiving a signal based on connection of the electric vehicle to a charging station;
receiving charging information about the electric vehicle including a current battery level determined from sensor data that measures at least one battery of the electric vehicle;
calculating a predicted charging duration for the electric vehicle at the charging station, based on the charging information;
identifying a task for execution by a computing resource of the electric vehicle based on the predicted charging duration, power consumption of the computing resource for execution of the task and other uncompleted tasks, and availability of the computing resource of the electric vehicle to complete the task during the predicted charging duration, wherein the power consumption of the computing resource is capable of draining the at least one battery during the connection of the electric vehicle to the charging station;
transmitting the task to the electric vehicle; and
controlling execution of the task by the computing resource of the electric vehicle, during the connection of the electric vehicle to the charging station, wherein a result for the task is produced in response to completion of the task.

10. The method of claim 9, wherein the charging information additionally includes a charging history of the electric vehicle.

11. The method of claim 10, wherein the availability of the computing resource of the electric vehicle to complete the task is determined based on preferences of an operator of the electric vehicle.

12. The method of claim 10, further comprising:
invoking a trained machine-learning model to calculate the predicted charging duration, using the charging information, to recharge the at least one battery to a full charge at the charging station.

13. The method of claim 12, wherein use of the trained machine-learning model to calculate the predicted charging duration further includes using information from a personal calendar.

14. The method of claim 9, wherein the predicted charging duration is calculated based on at least one of: a location of the electric vehicle, habits of a user of the electric vehicle, time of day, day of the week, or a holiday.

15. The method of claim 9, further comprising:
receiving validation results from a plurality of electric vehicles for the task; and
validating the result with the validation results.

16. The method of claim 9, further comprising:
calculating the availability of the computing resource of the electric vehicle to complete the task during the predicted charging duration, based on power requirements for the task and power requirements for charging the electric vehicle.

17. At least one non-transitory machine-readable medium to implement coordinating shared computing with an electric vehicle, the at least one non-transitory machine-readable medium capable of storing instructions that, when executed by processing circuitry, cause the processing circuitry to:
obtain a signal based on connection of the electric vehicle to a charging station;
obtain charging information about the electric vehicle including a current battery level determined from sensor data that measures at least one battery of the electric vehicle;
calculate a predicted charging duration for the electric vehicle at the charging station, based on the charging information;
identify a task for execution by a computing resource of the electric vehicle based on the predicted charging duration, power consumption of the computing resource for execution of the task and other uncompleted tasks, and availability of the computing resource of the electric vehicle to complete the task during the predicted charging duration, wherein the power consumption of the computing resource is capable of draining the at least one battery during the connection of the electric vehicle to the charging station;
cause transmission of the task to the electric vehicle; and
control execution of the task by the computing resource of the electric vehicle, during the connection of the electric vehicle to the charging station, wherein a result for the task is produced in response to completion of the task.

18. The machine-readable medium of claim 17, wherein the charging information additionally includes a charging history of the electric vehicle.

19. The machine-readable medium of claim 18, wherein the availability of the computing resource of the electric vehicle to complete the task is determined based on preferences of an operator of the electric vehicle.

20. The machine-readable medium of claim 18, wherein the instructions further cause the processing circuitry to:
invoke a trained machine-learning model to calculate the predicted charging duration, using the charging information, to recharge the at least one battery to a full charge at the charging station.

21. The machine-readable medium of claim 20, wherein use of the trained machine-learning model to calculate the predicted charging duration further includes using information from a personal calendar.

22. The machine-readable medium of claim 17, wherein the predicted charging duration is calculated based on at least one of: a location of the electric vehicle, habits of a user of the electric vehicle, time of day, day of the week, or a holiday.

23. The machine-readable medium of claim 17, wherein the instructions further cause the processing circuitry to:
receive validation results from a plurality of electric vehicles for the task; and
validate the result with the validation results.

24. The machine-readable medium of claim 17, wherein the instructions further cause the processing circuitry to:
calculate the availability of the computing resource of the electric vehicle to complete the task during the predicted charging duration, based on power requirements for the task and power requirements for charging the electric vehicle.

* * * * *